United States Patent [19]

Spatenka

[11] Patent Number: 5,486,321
[45] Date of Patent: Jan. 23, 1996

[54] METHOD FOR AUTO BODY REPAIR

[76] Inventor: Gary W. Spatenka, Rte. 1, Box 271, Owatonna, Minn. 55060

[21] Appl. No.: 415,144

[22] Filed: Mar. 30, 1995

Related U.S. Application Data

[63] Continuation of Ser. No. 160,894, Dec. 1, 1993, abandoned.

[51] Int. Cl.⁶ .................................................. B32B 35/00
[52] U.S. Cl. ............................ 264/36; 156/94; 264/162; 264/163; 425/12
[58] Field of Search ............................ 264/31–36, 162, 264/163, 267; 156/94; 425/11, 12

[56] References Cited

U.S. PATENT DOCUMENTS

| | | |
|---|---|---|
| 1,422,773 | 7/1922 | McCarthy . |
| 2,287,231 | 12/1940 | Cathcard et al. . |
| 2,546,577 | 12/1947 | Young . |
| 3,341,878 | 9/1967 | Habbard . |
| 3,470,048 | 9/1969 | Jones .......................................... 156/94 |
| 4,064,588 | 12/1977 | Cooper . |
| 4,133,913 | 1/1979 | Moore ........................................ 156/94 |
| 4,148,122 | 4/1979 | Phillips et al. ............................. 156/94 |
| 4,200,948 | 5/1980 | Nesseth . |
| 4,409,270 | 10/1983 | Faber et al. ................................ 264/36 |
| 4,496,500 | 1/1985 | Haber ........................................ 264/36 |
| 4,526,636 | 7/1985 | Mader ........................................ 156/94 |
| 4,732,633 | 3/1988 | Pokorny .................................... 156/94 |
| 4,759,092 | 7/1988 | Duddy . |
| 4,800,054 | 1/1989 | Roestenberg ............................. 156/94 |
| 5,007,129 | 4/1991 | Hainey . |

*Primary Examiner*—Karen Aftergut
*Attorney, Agent, or Firm*—Merchant, Gould, Smith, Edell, Welter & Schmidt

[57] ABSTRACT

An auto body shaping and smoothing tool includes an elongated handle with a blade mounted along one edge thereof. The blade includes fine teeth which are used for shaping auto body filler material. In the method the filler material is allowed to dry to a semi-hardened state which is still shapeable. The tool is drawn across the material to shape and smooth it prior to full hardening. Once the material has reached a fully hardened state, final sanding takes place.

11 Claims, 2 Drawing Sheets

METHOD FOR AUTO BODY REPAIR

This is a continuation of application Ser. No. 08/160,894, filed Dec. 1, 1993, now abandoned.

BACKGROUND OF THE INVENTION

1. Field of the Invention

The present invention relates to a method and apparatus for auto body repair, and in particular to a tool and method for shaped auto body filler material.

2. Description of the Prior Art

Methods for repairing dents and other damage to automobile bodies are well known. Most repair techniques utilize a step straightening the dents as much as possible and then filling in the depressed areas with a "bondo" or other formable filler material, including plastic-containing and fiber-glass-containing materials. After the filler material is put in place over the damaged area, it is allowed to harden. The material is then ground and sanded to obtain a smooth surface which duplicates the original automobile body surface. The grinding and sanding process is a very labor-intensive and time-consuming process. The additional time and labor greatly increases the cost of repairs since the filler material must be substantially hardened before it can be ground or sanded. In addition, sanding and grinding creates large amounts of dust, which requires cleaning and containment and poses health hazards to workers.

The time and energy spent waiting for the filler material to dry and then reshaping the filler material after it has dried fully adds greatly to the expense and effort required to repair auto body damage. It can be seen that if methods are used which decrease the amount of time and the labor involved with re-shaping the filler material, the cost and effort required to repair auto body damage could be greatly decreased. In addition, if the time required to wait for drying were reduced or eliminated, the speed of the process would be greatly increased. The present invention addresses these and other problems associated with automobile body repair.

SUMMARY OF THE INVENTION

The present invention is directed to a method and apparatus for smoothing auto body filler. A shaping tool includes an elongated handle having a blade mounted along one edge thereof. The blade includes many small teeth extending therefrom.

According to the method of repair of the present invention, the body filler is spread over the damaged area and is then allowed to partially harden. When the filler material has hardened for approximately half of its normal hardening time, a tool is drawn over the area to smooth and shape the filler. The sharpened blade allows the partially-hardened material to be smoothed and shaped rather than sanded. When the shaping of the partially-hardened material has been completed by the shaping tool, the material is allowed to completely set. At this point, the minor finishing work can be completed with normal sandpaper.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals indicate corresponding elements throughout the several views.

DETAILED DESCRIPTION OF THE PREFERRED EMBODIMENT

Figure 1:
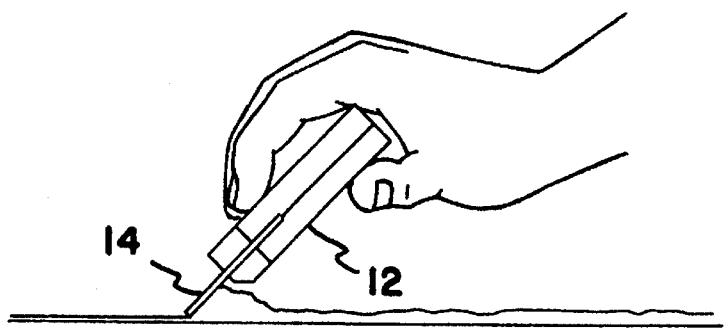
FIG. 1 shows perspective view of an auto body repair tool according to the principles of the present invention.
Figure 2:
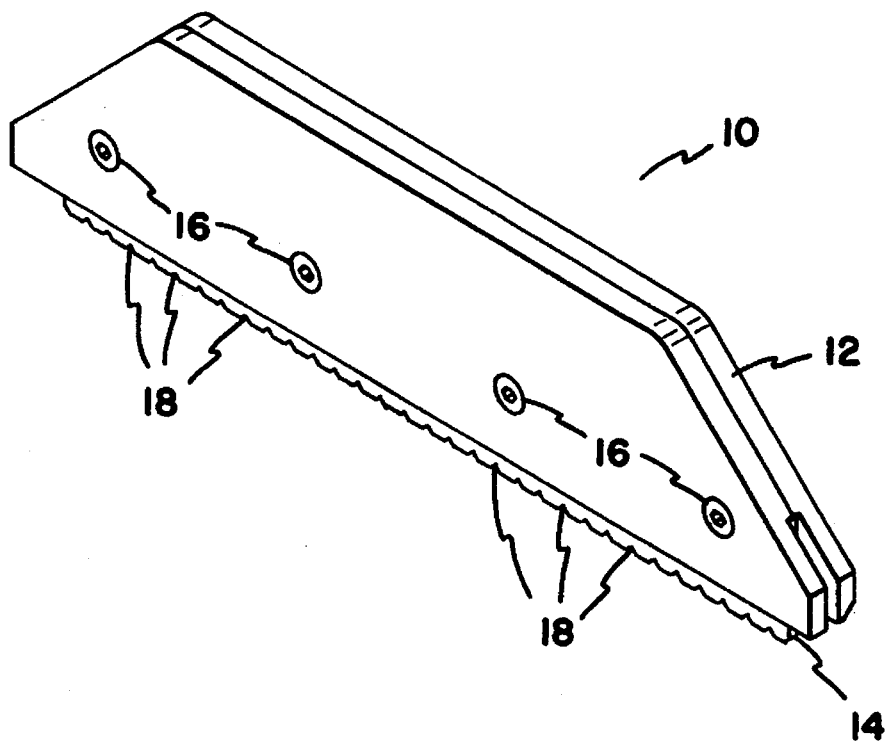
FIG. 2 shows a side elevational view of the tool shown in FIG. 1 being used to shape and smooth filler material; and, FIG. 3 shows a flow chart of the steps of a method according to the principles of the present invention utilizing the tool shown in FIG. 1.

Referring now to the drawings, wherein like reference numerals designate corresponding structure throughout the views, and referring in particular to FIG. 1, there is shown an auto body-shaping tool, generally designated 10. The tool 10 includes an elongate handle portion 12 which can be easily gripped and a blade portion 14 along an edge of the handle 12. The blade 14 is retained in the handle 12 by a number of set screws or other retaining devices 16. It can be appreciated that the tool 10 is configured so that the handle may be easily gripped at an upper portion of the handle 12 while the lower portion retaining the blade 14 may be put in contact with the surface to be worked, as shown in FIG. 2. The blade 14 includes a plurality of teeth 18 which are utilized to shape the working surface. The teeth 18 are very fine and a preferred embodiment includes 14 teeth per inch. Another preferred embodiment which is more adapted for shaping a larger area includes 12 teeth per inch. It can be appreciated that the handle 12 and blade 14 may both come in a number of different lengths, so that a number of tools may be used, depending on the type and size of the surface which is being worked.

According to the present invention, the tool 10 is utilized to shape and smooth surfaces prior to fully setting, as has been done with prior methods. The damaged area has filler material placed therein until the area is filled. The filler material is then allowed to dry for approximately five to eight minutes so that it is partially set. At this point, the tool 10 is drawn across the filler material 20 in a substantially linear motion without back and forth stroking action with the handle 12 leading the blade 14 so that the blade is drawn at an acute angle to the filler surface, approximately 45 degrees in the method shown and the blade 14 shapes the material to the approximate desired profile, as shown in FIG. 2. The teeth 18 of the blade 14 are able to shape the filler material 20 and remove excess material so that the desired shape is obtained. It can be appreciated that in this state, the filler material 20 is still somewhat pliable so that the shaping tool 10 is utilized with little effort and substantial time savings.

Once the filler material has been substantially shaped with the shaping tool 10, the final sanding may take place. Since the shaping tool 10 has substantially smoothed and shaped the filler material prior to sanding, little effort and time is required for final sanding.

Figure 3:
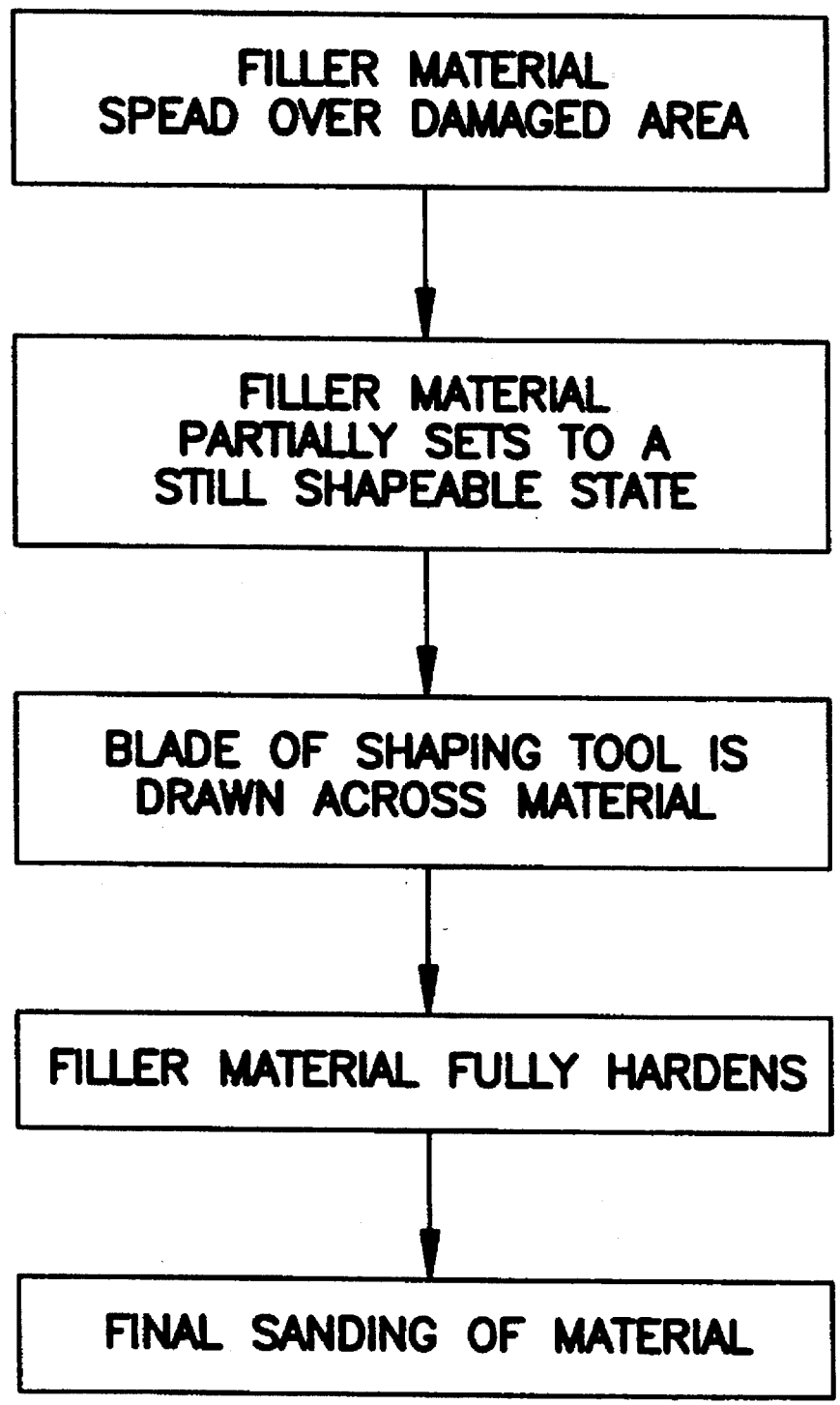

Referring now to FIG. 3, the shaping process steps are shown. After the auto body metal has been shaped as much as possible, filler material is spread over the damaged area, filling the indented areas. The material then hardens, but while it is still shapable, the shaping tool is drawn across the material to provide a smooth shaped surface. The material continues to harden until fully set. Final sanding provides a smooth, paintable surface.

It can be appreciated that according to the present invention, as the filler material hardens, shaping can take place. In prior methods, all shaping had to be conducted after the filler material had fully set. This required additional time. Under prior methods, once the filler material was set, the amount of labor required to sand and grind it down to an acceptable finish was also increased and had to take place after the hardening process was completed. According to the present invention, not only is labor reduced, but the total working time is also greatly speeded up. In addition, the total labor involved is also greatly reduced. The blades in the preferred embodiment are hacksaw blades or other blades having relatively small teeth. Preferably, blades with various numbers of teeth per inch can be made with the teeth shaped and arranged similarly to those in hacksaw blades, although other shapes and arrangements are also suitable. The blades are usually hardened steel and will last indefinitely and only need infrequent replacement. Sandpaper, on the other hand, is constantly wearing out and requires constant replacement. In addition, the dust created from sandpaper makes for a more hazardous work environment. Shaping with partially-set pliable filler material does not produce any hazardous dust.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of auto body damage repair, comprising the steps of:
   (a) distributing filler material over a damaged area;
   (b) allowing the filler material to harden to a semi-pliable state;
   (c) drawing a toothed tool across the filler material in substantially linear motion without back and forth stroking action to smooth and shape the filler material without sanding, wherein the teeth lag behind and are drawn along by the rest of the tool;
   (d) allowing the shaped material in the damaged area to harden to a sandable hardness; and,
   (e) sanding the hardened filler material to a smooth finish to effect repair of the damaged area.

2. A method according to claim 1, wherein a blade of the toothed tool is pulled at a 45 degree angle to a surface of the filler material.

3. A method according to claim 1, wherein a blade of the toothed tool includes 14 teeth per inch.

4. A method according to claim 1, wherein a blade of the toothed tool includes 12 teeth per inch.

5. A method according to claim 1, wherein the filler material dries to the semi-pliable state between 5 and 8 minutes.

6. A method of automobile body repair, comprising the steps of:
   (a) distributing filler material over a damaged area;
   (b) allowing the filler material to set for 5–8 minutes to a semi-hardened state;
   (c) drawing a tool in a substantially straight line without back and forth stroking action with a leading end toward the drawing direction and a following end, and having a first edge including a multiplicity of teeth disposed thereon along the filler material such that the first edge contacts the filler material and is at the following end of the tool as the tool is drawn along the filler material to smooth and shape the filler material without sanding;
   (d) allowing the filler material to set to a hardened state; and,
   (e) further smoothing the filler material to a fine finish to effect repair of the damaged area with hardened and smoothed filler material.

7. A method according to claim 6, wherein the first edge comprises a saw blade, and wherein the blade is drawn along the filler material to shave off excess filler material.

8. A method according to claim 7, wherein the tool comprises an elongate handle with the saw blade removably mounted along the first edge.

9. A method according to claim 7, wherein the blade comprises a hacksaw blade.

10. A method according to claim 7, wherein the blade is moved along the filler material at about a 45 degree angle to an outer surface of the filler material.

11. A method of auto body damage repair, comprising the steps of:
    (a) distributing filler material over a damaged area;
    (b) allowing the filler material to harden to a semi-pliable state;
    (c) drawing a toothed tool having a toothed blade across the filler material substantially linearly without back and forth stroking action to shape the material in the damaged area without sanding, the blade lagging behind the rest of the toothed tool during the drawing and forming about a 45 degree angle to an outer surface of the filler material being drawn over by the blade of the toothed tool;
    (d) allowing the shaped material in the damaged area to harden to a sandable hardness; and,
    (e) sanding the hardened filler material to a smooth finish to effect repair of the damaged area.

* * * * *